US007805289B2

United States Patent
Zhou et al.

(10) Patent No.: US 7,805,289 B2
(45) Date of Patent: Sep. 28, 2010

(54) ALIGNING HIERARCHAL AND SEQUENTIAL DOCUMENT TREES TO IDENTIFY PARALLEL DATA

(75) Inventors: Ming Zhou, Beijing (CN); Cheng Niu, Beijing (CN); Lei Shi, Beijing (CN)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 11/483,941

(22) Filed: Jul. 10, 2006

(65) Prior Publication Data

US 2008/0010056 A1    Jan. 10, 2008

(51) Int. Cl.
G06F 17/28    (2006.01)
G06F 17/20    (2006.01)
(52) U.S. Cl. .................... 704/7; 704/1; 704/8
(58) Field of Classification Search ........... None
See application file for complete search history.

(56) References Cited

U.S. PATENT DOCUMENTS

| | | | |
|---|---|---|---|
| 5,893,134 A | 4/1999 | O'Donoghue et al. | |
| 6,236,958 B1* | 5/2001 | Lange et al. ............ | 704/8 |
| 6,519,580 B1 | 2/2003 | Johnson et al. ........... | 706/47 |
| 6,812,941 B1 | 11/2004 | Brown et al. ............ | 345/854 |
| 7,146,358 B1* | 12/2006 | Gravano et al. .......... | 707/4 |
| 2002/0162000 A1 | 10/2002 | Benzler ................. | 713/170 |
| 2003/0233542 A1 | 12/2003 | Benaloh ................ | 713/156 |
| 2005/0108726 A1 | 5/2005 | Need et al. ............. | 719/318 |
| 2005/0144147 A1 | 6/2005 | Lee et al. .............. | 706/12 |
| 2005/0228643 A1* | 10/2005 | Munteanu et al. ........ | 704/9 |
| 2005/0273317 A1 | 12/2005 | Brill | |
| 2006/0005250 A1 | 1/2006 | Chu et al. ............... | 726/26 |
| 2006/0026438 A1 | 2/2006 | Stern et al. ............. | 713/184 |
| 2006/0031686 A1 | 2/2006 | Atallah ................. | 713/190 |
| 2006/0053307 A1 | 3/2006 | Xu et al. ............... | 713/190 |
| 2007/0091790 A1* | 4/2007 | Passey et al. ............ | 370/217 |
| 2007/0250306 A1* | 10/2007 | Marcu et al. ............ | 704/9 |

OTHER PUBLICATIONS

Meyers et al., Alignment of Shared Forests for Bilingual Corpora, 1996, Proceedings of the 16th Conference, pp. 460-465.*
Ballim et al., The Use of Automatic Alignment on Structured Multi-lingual Documents, 1998, Springer Berlin/Heidelberg, vol. 1375/1998, pp. 464-475.*
PCT/US2007/015210 International Search Report Jun. 28, 2007.
"Securing the Anonymity of Content Providers in the World Wide Web", by: Thomas Demuth et al., Fern Universitat Hagen Germany, 9 pages, 1999.

(Continued)

Primary Examiner—Matthew J Sked
(74) Attorney, Agent, or Firm—Westman, Champlin & Kelly, P.A.

(57) ABSTRACT

A set of candidate parallel pages is identified based on trigger words in one or more pages downloaded from a given network location (such as a website). A set of document trees representing each of the candidate pages are aligned to identify translationally parallel content and hyperlinks. The parallel content is further fed into conventional sentence aligner for parallel sentences. And the parallel hyperlinks usually refer to other parallel documents, and lead to a recursive mining of parallel documents.

13 Claims, 6 Drawing Sheets

OTHER PUBLICATIONS

"Obfuscation of Design Intent in Object-Oriented Aplications" by: Mikhail Sosonkin et al., Polytecnic University, New York pp. 142-153, 2003.

"Evaluation of Mutational Capability and Real-Time Applicability of Obfuscation Techniques" IEICE Transactions on Fundamentals of Electronics, Communications and Computer Sciences, by: Shinsaku Kiyomoto et al. 2 pages, 2006.

"Automatically Determining an Anonymous Author's Native Language" Abstract Only Conference title: Intelligence and Security Informatics: IEEE International Converence on Intelligence and Security Informatics, ISI 2005, Atlanta, GA USA May 19-20, 2005, 2 pages.

International Search Report and Written Opinion dated Feb. 5, 2008 regarding Serial No. PCT/US/2007/015210.

* cited by examiner

ALIGNING HIERARCHAL AND SEQUENTIAL DOCUMENT TREES TO IDENTIFY PARALLEL DATA

BACKGROUND

Parallel bilingual corpora, as used herein, refers to textual data in a first language that is identified as a translation of textual data in a second language. For the sake of example, the textual data discussed herein is documents, but other textual data can be used as well.

When one document is a translation of another document, the two documents are referred to as parallel, bilingual documents. Therefore, a parallel, bilingual corpora refers to a corpus of data in a first language that is a translation of a corpus of data in a second language.

Within a set of parallel documents, sentences in those documents which are translations of one another are often identified. These are referred to as aligned sentences. Therefore, if a document in a first language coincides with a parallel document in a second language, and the sentences in the two documents are aligned with one another (in that a sentence in the first language is aligned with its translation in the second language) then the two documents are referred to as parallel, sentence-aligned, bilingual documents.

There is currently a wide need for parallel, bilingual corpora. For instance, such corpora are often critical resources for training statistical machine translation systems, and for performing cross-lingual information retrieval. Additionally, some such corpora have even been exploited for various monolingual natural language processing tasks, such as word sense disambiguation and paraphrase acquisition.

However, large scale parallel corpora are currently not readily available for most language pairs. Even in those languages where some such corpora are available, the data in those corpora are usually restricted to government documents or news wire texts. Because of the particular writing styles or domain-specific language used in these types of documents, these corpora cannot be easily used in training data driven machine translation systems or information retrieval systems, or even the monolingual, natural language processors discussed above, for a range of domains in different language pairs.

There has recently been a sharp increase in the number of bilingual pages available on wide area networks (such as websites). Therefore, some web mining systems have been developed to automatically obtain parallel, bilingual corpora from the worldwide web. These systems use uniform resource locators (URLs), and assume that parallel web pages are named with predefined patterns to facilitate website maintenance. Therefore, when these systems are given bilingual website URLs, they use the predefined URL patterns in an attempt to discover candidate parallel documents within that website. Content-based features are then used to verify the translational equivalents of the candidate pairs.

These types of systems have met with limited success. For instance, there is a wide diversity of web page styles and website maintenance mechanisms. Therefore, bilingual websites often use varied naming schemes for parallel documents, which do not conform to predefined patterns.

In addition, these URL pattern-based mining systems can be problematic with respect to bandwidth. These types of mining processes require a full host crawling to collect URLs before using predefined URL patterns to discover possible parallel documents. Therefore, these URL pattern-based systems often require high bandwidth, and high cost, and result in slow download speeds. Since even many bilingual websites have only a very limited number of parallel documents, a significant portion of the network bandwidth is wasted on downloading web pages that do not have translational counterparts.

In addition, due to the noisy nature of web documents, parallel web pages may include non-translational content and many out of vocabulary words. Both of these reduce the sentence alignment accuracy, even after two parallel documents have been identified. Further, conventional sentence aligners only operate on conventional text, without considering other factors, such as layout similarity.

The discussion above is merely provided for general background information and is not intended to be used as an aid in determining the scope of the claimed subject matter.

SUMMARY

A set of candidate parallel pages is identified based on trigger words in one or more pages downloaded from a given network location (such as a website). A set of document trees representing each of the candidate pages are aligned to identify translationally parallel content.

In one embodiment, the document trees are generated following Document Object Model (DOM) which is a known application programming interface for navigating valid HTML documents. To facilitate the tree alignment computation, in one embodiment, minor modification is performed on the DOM tree. In another embodiment, once the trees are aligned, parallel hyperlinks are identified. The pages corresponding to those hyperlinks are then downloaded as a new set of candidate parallel pages.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
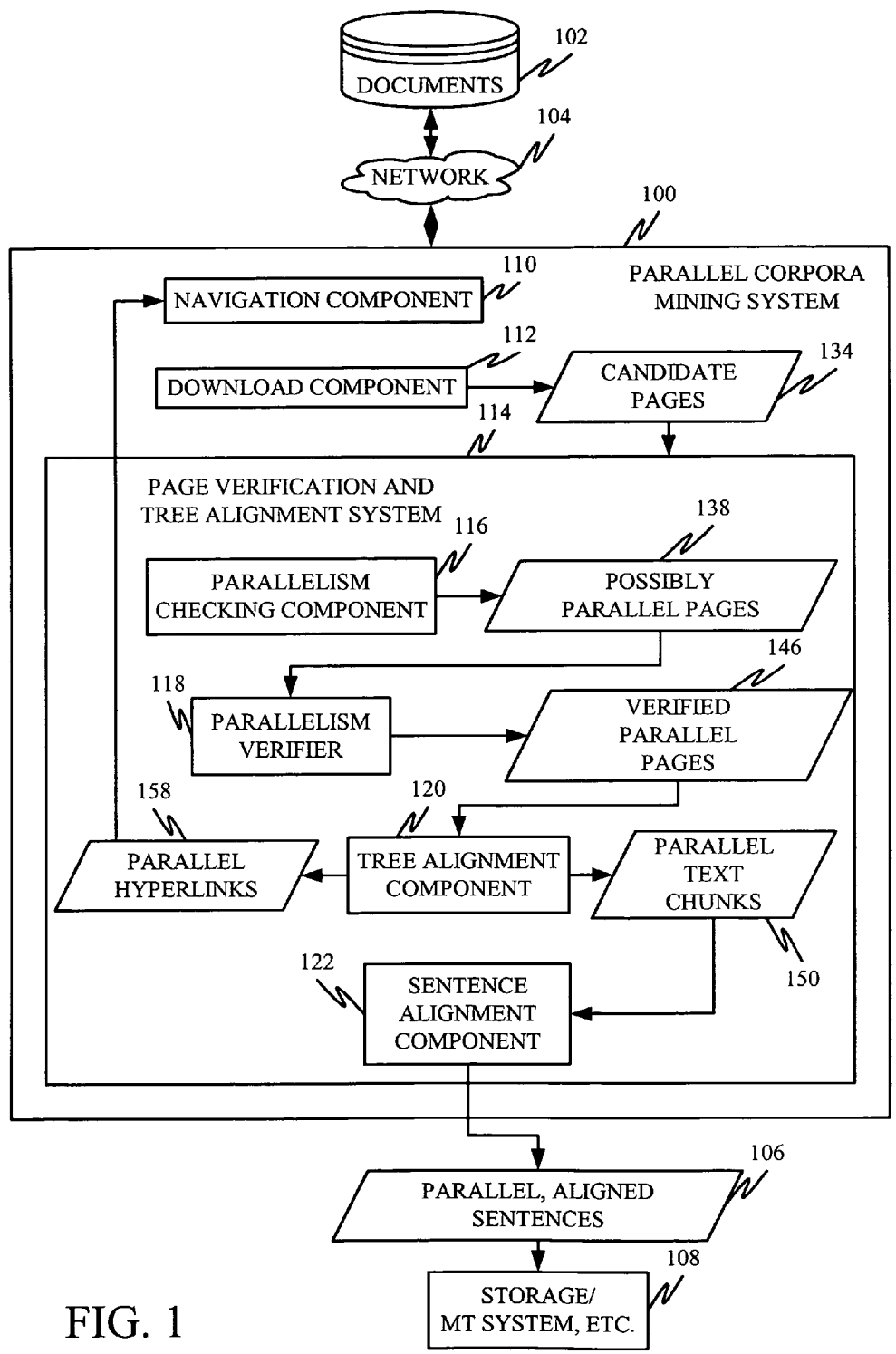
FIG. 1 is a block diagram of one illustrative embodiment of a parallel corpora mining system.

FIG. 1 is a block diagram of a parallel corpora mining system 100 in accordance with one embodiment. System 100 is shown coupled to documents 102 through a network 104. Network 104 is illustratively a wide area network, such as the Internet, but could be a local area network or a different type of network as well. Also, of course, documents 102 illustratively represent data or other textual content at one or a variety of different sites accessible by system 100 through network 104.

In one embodiment, system 100 retrieves data from documents 102 over network 104 and generates parallel, aligned sentences 106 that are output for one of a variety of different reasons, such as for storage, for use in a machine translation system, for use in a monolingual natural language processing system, for use in an information retrieval system, etc. These various systems are indicated by block 108 in FIG. 1.

The embodiment shown in FIG. 1 illustrates that system 100 includes navigation component 110, download component 112, and page verification and tree alignment system 114. Tree alignment system 114, itself, illustratively includes parallelism checking component 116, parallelism verifier component 118, tree alignment component 120, and sentence alignment component 122.

Figure 2:
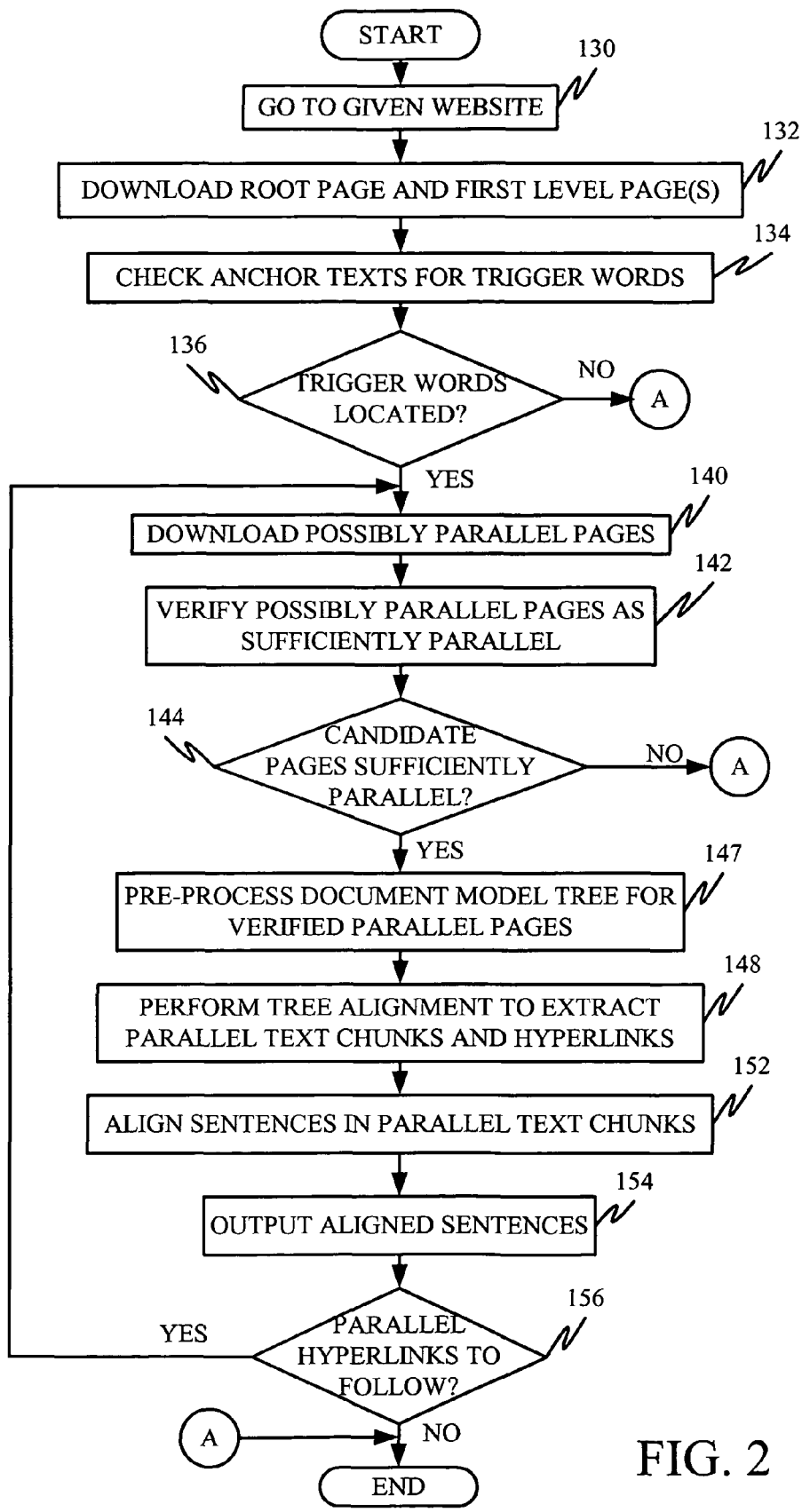
FIG. 2 is a flow diagram illustrating one illustrative embodiment of the overall operation of the system shown in FIG. 1.

FIG. 2 is a flow diagram illustrating one illustrative embodiment of the operation of system 100 in more detail. FIG. 2 is described with respect to operation of system 100 relative to the World Wide Web, and Internet. However, as described above, any other type of network can be used as well.

In any case, navigation component 110 is illustratively a conventional network navigation component, such as a web browser, that can navigate system 100 to a given web page. Once an initial website address is provided to navigation component 110, navigation component 110 navigates to the website corresponding to that address. This is indicated by block 130 in FIG. 2. In one illustrative embodiment, the given website is given by a user, or an automated website location mechanism, such as a crawler, or by any other desired input device.

Once at the given website, download component 112 illustratively downloads the root page and the first level pages from the website. The first level pages are those pages directly linked by the root page. This is indicated by block 132 in FIG. 2. The downloaded pages are referred to as candidate pages 134 in FIG. 1. The candidate pages are used to check if the web site is bilingual. If so, the candidate pages are processed for parallel pair identification, verification and tree alignment by system 114.

There are several methods to check if the web site is bilingual, and further identify possibly parallel pairs of pages from the candidates. In the illustrative embodiment, the anchor texts are compared against predefined trigger words for this task. If a candidate page 134 is linked to other pages, it will illustratively be linked through a hyperlink. The text corresponding to the hyperlinks is referred to herein as anchor text. Parallelism checking component 116 then checks the anchor text for all of the downloaded pages for trigger words. This is indicated by block 134 in FIG. 2.

Trigger words are words that reflect translational equivalence among web pages. Some examples of predefined trigger words (or trigger strings) include trigger words for English translation such as "English" or "English version". In other words, if a French language web page is downloaded, and one of the hyperlinks is labeled "English" or "English version" that trigger text likely indicates that a translational equivalent of the French web page exists and can be accessed through that hyperlink. Similar trigger words exist for other languages, but may be slightly different. For instance, trigger words for the Chinese language may be "Chinese", "Chinese version", "simplified Chinese", "traditional Chinese", etc.

In one embodiment, parallelism checking component 116 checks the anchor text for trigger words by comparing the anchor text with a list of predefined strings that are known to reflect translational equivalence among web pages. If no trigger words are found in the anchor text, as indicated by block 136 in FIG. 2, then the current web site is not a bilingual web site, and processing ends for the given website. However, if at block 136, the trigger words are located, then the two pages associated with the trigger words (the English version and the Chinese version, for example) are identified as possibly parallel pages 138 in FIG. 1. The possibly parallel pages 138 are then downloaded by download component 112. This is indicated by block 140 in FIG. 2.

At this point in the processing, the pages are regarded as candidate parallel pairs (or possibly parallel pairs) which have not been verified yet. Therefore, the possibly parallel pages 138 are provided to parallelism verifier component 118. Component 118 verifies that the possibly parallel pages are sufficiently parallel to be considered translationally equivalent such that aligned bilingual data can be obtained from them.

Figure 2A:
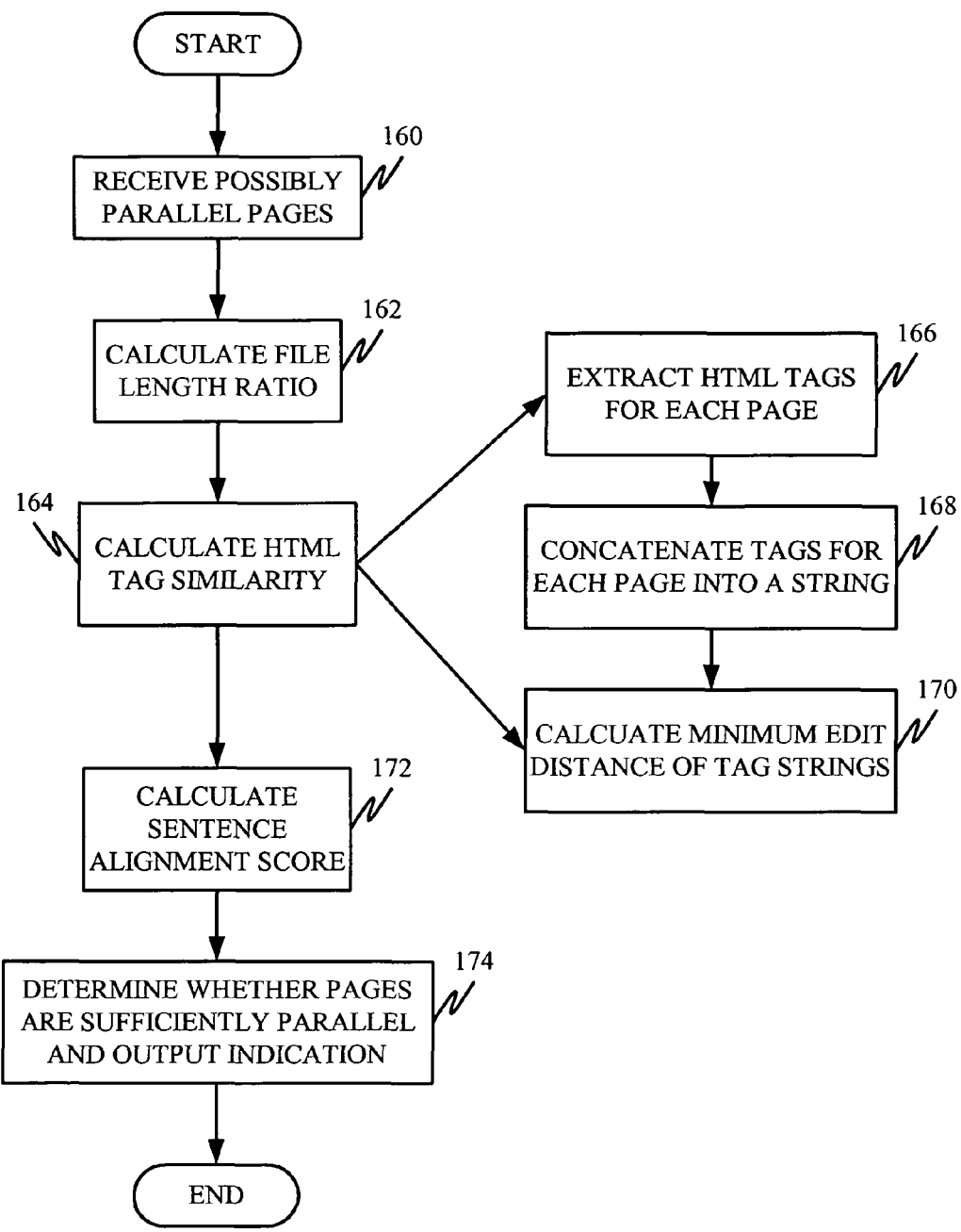
FIG. 2A is a flow diagram illustrating verification of parallelism of two pages.

In one embodiment, parallelism verifier component 118 is illustratively a binary maximum entropy based classifier. However, other classifiers or verification components (rules based or statistical) can be used as well. In the illustrative embodiment, however, the classifier uses three features in determining whether the pages are sufficiently parallel. FIG. 2A is a flow diagram illustrating one illustrative embodiment in which these features are used in parallelism verifier component 118. The three features include the file length ratio, HTML tag similarity, and a sentence alignment score. Thus, in order to determine whether the pages are sufficiently parallel, component 118 first receives the possibly parallel pages 138. This is indicated by block 160 in FIG. 2A.

Component 118 then calculates the file length ratio for the two pages. This is indicated by block 162. The file length ratio is relatively straight forward and is simply the ratio of the lengths of the files that represent each of the web pages under consideration.

Component 118 then calculates the HTML tag similarity. This is indicated by block 164 in FIG. 2A. The HTML tag similarity can be calculated using any of a wide variety of methods. However, one illustrative and exemplary method is indicated by blocks 166, 168 and 170 in FIG. 2A. In accordance with that illustrative embodiment, HTML tag similarity is determined by first extracting all of the HTML tags for each page. This is indicated by block 166. The HTML tags for each page are then concatenated into a string, such that one concatenated string is formed for each of the two pages. Then, a minimum edit distance is calculated between the two tag strings associated with the pages. In one embodiment, the HTML tag similarity score is defined as the ratio of the number of matching tags in the concatenated strings, relative to the total number of strings. Other techniques for determining similarity can be used as well.

In any case, component 118 also calculates the sentence alignment score, as indicated by block 172 in FIG. 2A. The sentence alignment score can be calculated using a wide variety of different methods as well. However, in one exemplary embodiment, the sentence alignment score is the ratio of the number of aligned sentences on the two pages to the total number of sentences in both files corresponding to the two pages. One embodiment for determining whether sentences are aligned is by aligning document object model trees for the two pages. This is described in greater detail below.

Once the three features (file length ratio, HTML tag similarity, and sentence alignment score) have been computed for the two pages, component 118 determines whether the pages are sufficiently parallel, and outputs an indication as to that determination. This is indicated by block 174 in FIG. 2A. In the exemplary embodiment being discussed, component 118 is a binary maximum entropy classifier and simply classifies the two pages as either being sufficiently parallel, or not sufficiently parallel, based on the three features discussed above. The classifier can be trained using any desired training mechanism, and one such mechanism is referred to as the iterative scaling algorithm, which is known.

Referring again to FIGS. 1 and 2, component 118 verifies the possibly parallel pages as being sufficiently parallel. This is indicated by block 142 in FIG. 2.

If the pages are not sufficiently parallel, as indicated by component 118 at block 144 in FIG. 2, then processing of the two candidate pages has concluded. However, if, at block 144, component 118 determines that the two pages are sufficiently parallel, then the component 118 has determined that the pages are verified parallel pages 146 and are, for the sake of the current processing, truly translationally equivalent such that they can be used in generating parallel sentences and referring to more parallel web pages. Thus, component 118 submits verified parallel pages 146 to tree alignment component 120 for alignment.

Tree alignment component 120 first obtains a document tree for each of the verified parallel pages 146. Each node of the document tree illustratively includes two fields, the first being an HTML tag field, and the second being text associated with the node. In one illustrative example, the document tree structure follows the document object model (DOM) with minor modifications. DOM is published through the World Wide Web consortium, and is a known application programming interface for valid HTML documents. For the sake of the present example, the discussion will proceed with respect to the document tree structure associated with each web page being a DOM tree, although it will be understood that other such tree structures can be used as well.

Once the DOM tree is obtained for each of the verified parallel pages 146, tree alignment component 120 can illustratively perform any desired preprocessing on the DOM trees to place them in a desired form for further processing. This is indicated by block 147 in FIG. 2. One embodiment of preprocessing is described below with respect to FIGS. 3A and 3B.

Once the DOM trees are in the desired form, tree alignment component 120 illustratively performs tree alignment to align the DOM trees that represent the web pages. This is indicated by block 148 in FIG. 2. In the illustrative embodiment, tree alignment component 120 is a stochastic DOM tree alignment model that is used to align translationally equivalent content, including both textual chunks and hyperlinks in the DOM trees for the pair of verified parallel pages 146. The tree alignment step 148 is described in greater detail below with respect to FIG. 4. Once the DOM trees are aligned, and the parallel text chunks and hyperlinks are identified, the parallel text chunks 150 are provided to sentence alignment component 122.

Sentence alignment component 122 then aligns the sentences within the parallel text chunks 150 and outputs them for storage, or for use in another system, as parallel, aligned sentences 106. Aligning these sentences from the parallel text chunks can be done in any desired way and is illustrated by block 152 in FIG. 2. In one exemplary embodiment, the HTML structural similarities between parallel web pages is exploited, and a cascaded approach is used to align the sentences. First, in the exemplary embodiment, text chunks associated with the DOM tree nodes are aligned as discussed above. Then, for each pair of parallel text chunks, a known sentence aligner can be used to align the sentences. One such sentence aligner models word for word translation from one language to another language, without considering word order, and combines the word for word translation model with another model that represents the length of the two sentences in the different languages, under a maximum likelihood criterion. Of course, other types of sentence alignment can be used as well. Outputting the aligned sentences is indicated by block 154 in FIG. 2.

Tree alignment component 120 also illustratively determines whether there are any parallel hyperlinks, after the two DOM trees have been aligned with one another. This is indicated by block 156 in FIG. 2. If there are no aligned hyperlinks in the two DOM trees, then processing of the two parallel pages is complete. However, if there are parallel hyperlinks in the aligned DOM trees, then this can be regarded as an anchor to new parallel data. It has been found that using parallel hyperlinks in the two aligned DOM trees to refer to parallel web pages is a general and stable pattern for identifying parallel, bilingual data. Therefore, if there are parallel hyperlinks to follow at block 156 in FIG. 2, then those parallel hyperlinks 158 are provided to navigation component 110 and processing reverts back to block 140 in FIG. 2. Navigation component 110 navigates system 100 to the web pages associated with the parallel hyperlinks 158, and download component 112 downloads the pages associated with the parallel hyperlinks as possibly parallel pages 138. Those pages 138 are then submitted to parallelism verifier component 118 for verification, and so forth.

Figures 3A, 3B:
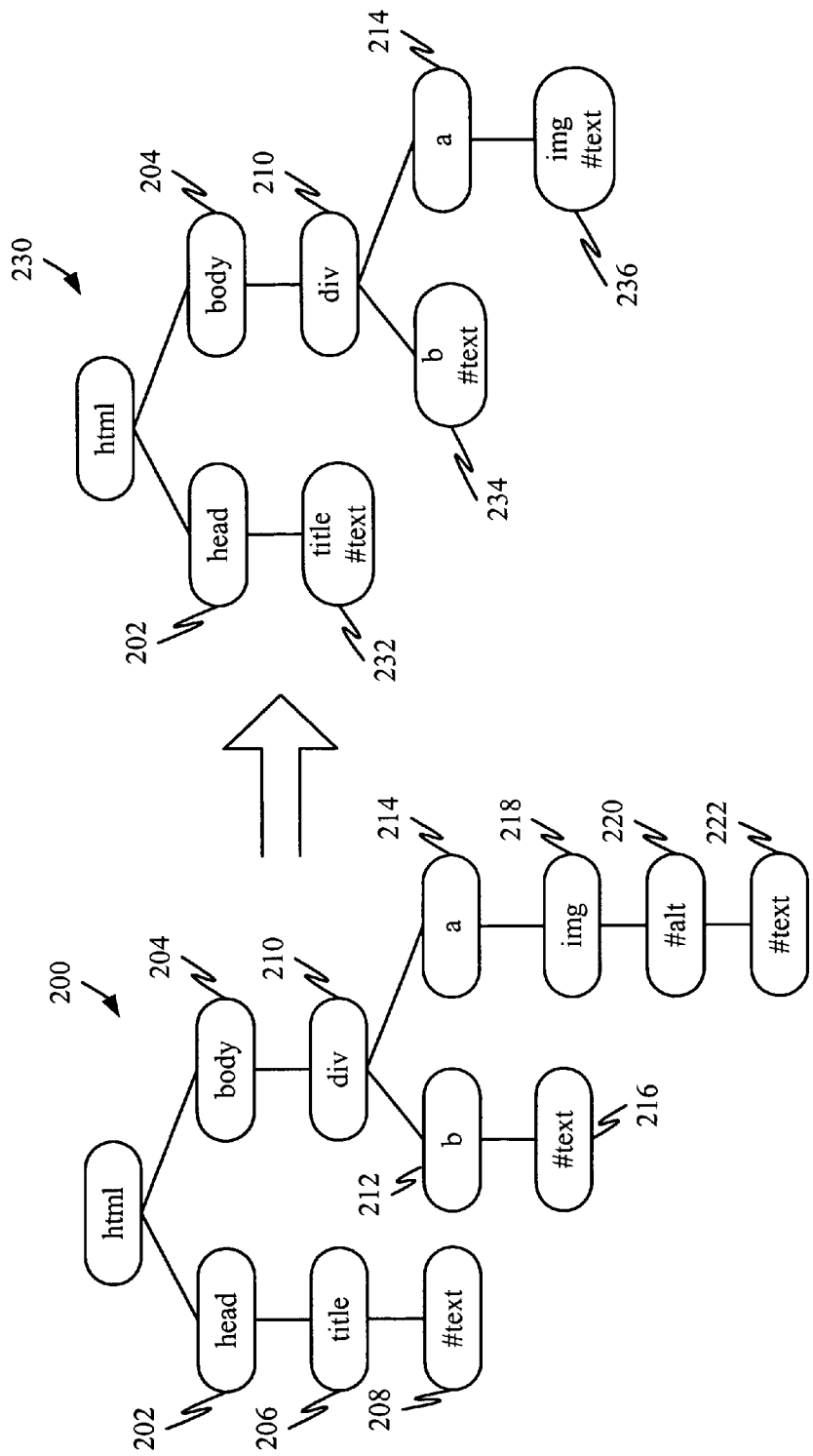
FIGS. 3A and 3B illustrate embodiments of document trees that model a web page.

FIGS. 3A and 3B illustrate the optional step of preprocessing the DOM trees at block 147 in FIG. 2. As is known, using document object modeling to represent a web page, the logical structure of the HTML document is represented as a tree which is, of course, hierarchical and sequential, where each node belongs to some pre-defined node type. Some such node types include "Document", "DocumentType", "Element", "Text", "Comment", "ProcessingInstruction", etc. Among all of these types of nodes, the nodes most important to one embodiment discussed herein are the "Element" nodes which correspond to the HTML tags in the document, and the "Text" nodes which correspond to the text chunks in the document.

FIG. 3A shows a conventional DOM tree 200 that represents an HTML document. It can be seen that the nodes in the HTML document include a head node 202 and a body node 204. Head node 202 has children nodes corresponding to the title 206 and text 208 for the title. The body node 204 has a child node that is a child DIV node 210 which, itself, has a set of child nodes 212 and 214. Node 212 has a child text node 216, and node 214 has a string of descendent nodes. The first descendent of node 214 is an image node 218, followed by an alternate node 220, and a text node 222.

In one illustrative example of preprocessing DOM tree 200, the alignment component 120 eliminates all nodes except the "element" nodes and the "text" nodes from the document model tree. In addition, the "alt" attribute, which represents a textual alternative when an image cannot be displayed, is represented by a "text" node. Finally, the "text" (which must be a leaf node in the tree) is combined with its parent "element" node into a single node, in order to make the representation of the alignment model more concise.

FIG. 3B illustrates a preprocessed tree 230 which is derived from tree 200 in FIG. 3A. It can be seen that text node 208 has been combined with title node 206 to form combined node 232. Similarly, text node 216 and its parent node 212 from tree 200 have been combined into combined node 234 in tree 230. In addition, the alt node 220 in tree 200 has been represented as a text node, and that, along with text node 222, have been combined with image node 218 to form combined node 236 in tree 230. It will be noted, despite these minor changes, tree 230 is still referred to as a DOM tree in the present description. In addition, these changes are made only for the sake of expedience and simplifying the model, but need not be made as contemplated by the present invention. Also, other forms of document tree structures can be used.

The operation of tree alignment component 120 in performing tree alignment (as in step 148 in FIG. 2) is now described in more detail. In accordance with one embodiment, tree alignment component 120 includes a tree alignment model that defines the alignment as both a hierarchical invariance process, and as a sequential order invariance process. In other words, the hierarchical invariance process means that if node A is aligned with node B, then the children of node A are either deleted or aligned with children of node B. The sequential order invariance process means that if node A is aligned with node B, then the sibling nodes following node A must either be deleted or aligned with the sibling nodes following node B. Thus, the hierarchical and sequential order of the nodes in the trees is not changed, although nodes can be deleted.

Figure 4:
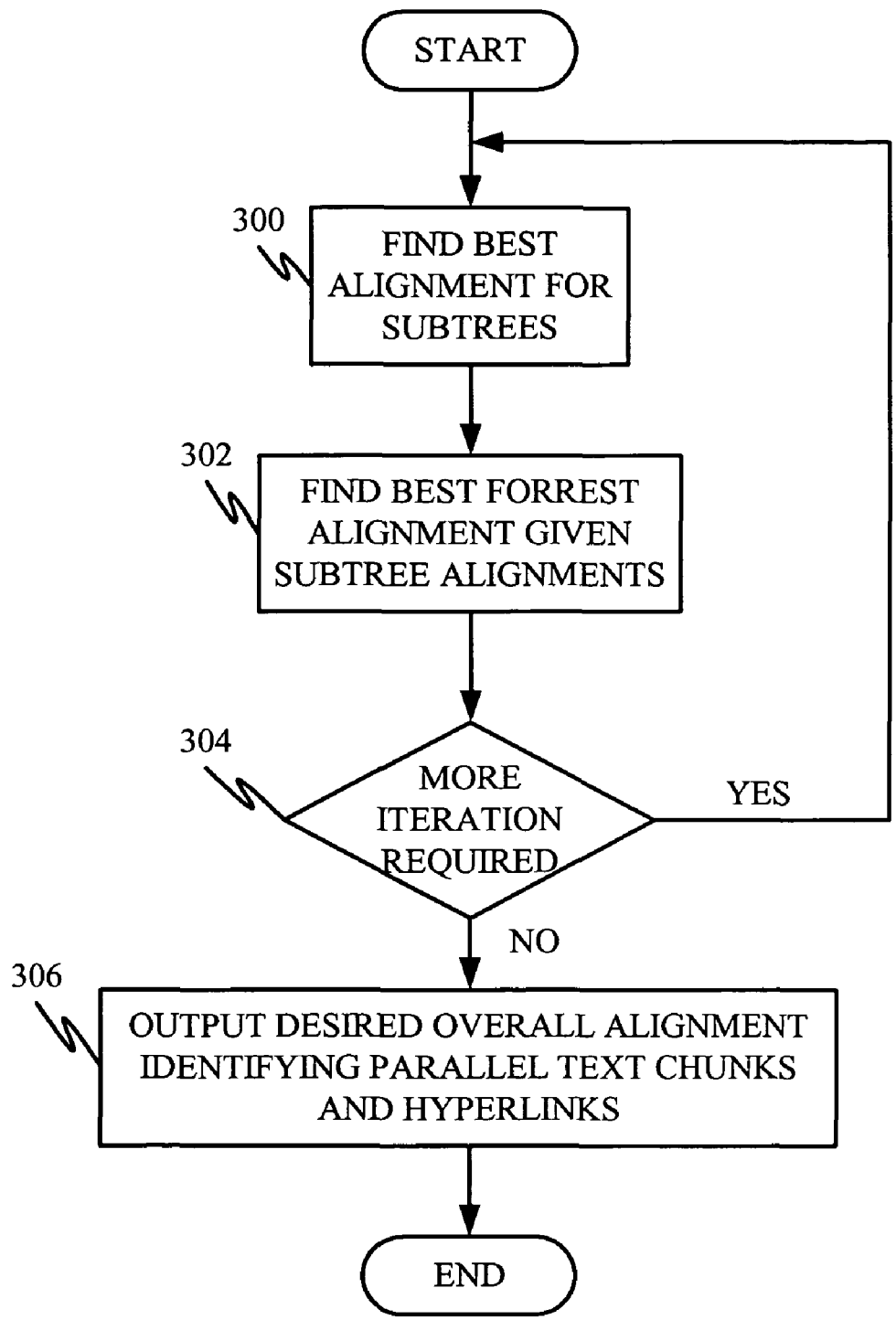
FIG. 4 is a flow diagram illustrating one illustrative embodiment for performing tree alignment.

FIG. 4 illustrates the operation of tree alignment component 120 in more detail. As is described below, each of the trees is illustratively formed of a plurality of different subtrees. The plurality of different subtrees are collectively referred to as a forest of subtrees. Tree alignment component aligns the two overall trees representing the two web pages by iteratively finding the best alignment for subtrees and then the forest including those subtrees.

In one embodiment, a bottom up approach can be used. Therefore, in FIG. 4, component 120 starts from the subtrees at the bottom of the trees and first finds the best alignment for the subtrees that represent the two web pages. This is indicated by block 300. Next, component 120 finds the best alignment of forests of the sequential subtrees, given the subtree alignments found in block 300. This is indicated by block 302. Based on any desired "goodness" criteria (or optimization criteria), component 120 then determines whether more iterations are required in steps 300 and 302. This is indicated by block 304. The iteration continues aligning subtrees and forests containing those subtrees until a desired goodness of alignment is achieved. That desired overall alignment will identify parallel text chunks and hyperlinks, as discussed above. Component 120 thus outputs the parallel text chunks and hyperlinks, as indicated by block 306.

To facilitate a more detailed presentation of the tree alignment model, the following symbols are introduced: given a HTML document D, $T^D$ refers to the corresponding DOM tree; $N_i^D$ refers to the $i^{th}$ node of $T^D$ (here the index of the node is in the breadth-first order), and $T_i^D$ refers to the sub-tree rooted at $N_i^D$, so $N_1^D$ refers to the root of $T^D$, and $T_1^D = T^D$; $T_{[i,j]}^D$ refers to the forest consisting of the sub-trees rooted at nodes from $T_i^D$ to $T_j^D$. $N_i^D.t$ refers to the text of node $N_i^D$; $N_i^D.l$ refers to the HTML tag of the node $N_i^D$; $N_i^D.C_j$ refers to the $j^{th}$ child of the node $N_i^D$; $N_i^D.C_{[m,n]}$ refers to the consecutive sequence of $N_i^D$'s children nodes from $N_i^D.C_m$ to $N_i^D.C_n$; the sub-tree rooted at $N_i^D.C_j$ is represented as $N_i^D.TC_j$ and the forest rooted at $N_i^D.C_{[m,n]}$ is represented at $N_i^D.TC_{[m,n]}$. Finally NULL refers to an empty node introduced for node deletion.

To accommodate the hierarchical structure of the DOM tree, two different translation probabilities are defined (the example deals with English and French languages so E means the English language and F means the French language):

$Pr(T_m^F|T_i^E)$: which is the probability of translating sub-tree $T_i^E$ into sub-tree $T_m^F$;

$Pr(N_m^F|N_i^E)$: which is the probability of translating node $N_i^E$ into $N_m^F$.

Also, $Pr(T_{[m,n]}^F|T_{[i,j]}^E, A)$ represents the probability of translating the forest $T_{[i,j]}^E$ into $T_{[m,n]}^F$ based on the alignment A. The tree alignment A is defined as a mapping from target nodes onto source nodes or the null node. Accordingly, $A_i$ (or $A_{[i,j]}$) refers to the mapping scheme for sub-tree $T_i^E$ (or forest $T_{[i,j]}^E$) onto a French subtree (or forest).

Given two HTML documents F (in French) and E (in English), the tree alignment task is defined as searching for A which maximizes the following probabilities:

$$Pr(A|T^F,T^E) \propto Pr(T^F|T^E,A)Pr(A|T^E) \qquad \text{Eq. 1}$$

where $Pr(A|T^E)$ represents the prior knowledge of the alignment configurations given $T^E$.

By introducing $p_d$ which refers to the probability of a source or target node deletion occurring in an alignment configuration, the alignment prior $Pr(A|T^E)$ can be assumed as the following binomial distribution:

$$Pr(A|T^E) \propto (1-p_d)^L p_d^M \qquad \text{Eq. 2}$$

where L is the count of non-empty alignments in A; and M is the count of $T^E$ node deletions in A.

$Pr(T^F|T^E,A)$, can be represented as follows: $Pr(T^F|T^E,A)=Pr(T_1^F|T_1^E,A)$, and $Pr(T_i^F|T_i^E,A)$ can be calculated recursively depending on the alignment configuration of A, as follows:

If $N_i^F$ is aligned with $N_i^E$, and the children of $N_i^F$ are aligned with children of $N_i^E$, then:

$$Pr(T_i^F|T_i^E, A) = Pr(N_i^F|N_i^E) Pr(N_i^F.TC_{[1,K]}|N_i^E.TC_{[1,K']}, A) \qquad \text{Eq. 3}$$

where K and K' are degree of $N_i^F$ and $N_i^E$, respectively.

If $N_i^F$ is deleted, and the children of $N_i^F$ is aligned with $T_i^E$, then:

$$Pr(T_i^F|T_i^E,A)=Pr(N_i^F|NULL)Pr(N_i^F.TC_{[1,K]}|T_i^E,A) \qquad \text{Eq. 4}$$

where K is the degree of $N_i^F$.

If $N_i^E$ is deleted, and $N_i^F$ is aligned with children of $N_i^E$, then:

$$Pr(T_i^F|T_i^E,A)=Pr(T_i^F|T_i^E.TC_{[1,K]},A) \qquad \text{Eq. 5}$$

where K is the degree of $N_i^E$.

To complete the alignment model, $Pr(T_{[m,n]}^F,T_{[i,j]}^E,A)$ needs to be estimated. As mentioned above, only the alignment configurations with unchanged node sequential order are considered as valid. So, $Pr(T_{[m,n]}^F|T_{[i,j]}^E,A)$ can be estimated recursively corresponding to the following three alignment configurations of A:

If $T_m^F$ is aligned with $T_i^E$, and $T_{[m+1,n]}^F$ is aligned with $T_{[i+1,j]}^E$, then:

$$Pr(T_{[m,n]}^F|T_{[i,j]}^E,A)=Pr(N_m^F|N_i^E)Pr(T_{[m+1,n]}^F|T_{[i+1,j]}^E,A) \qquad \text{Eq. 6}$$

If $N_m^F$ is deleted, and $N_m^F$'S children $N_m^F.C_{[1,K]}$ is combined with $T_{[m+1,n]}^F$ to align with $T_{[i,j]}^E$, then:

$$Pr(T_{[m,n]}^F|T_{[i,j]}^E, A) = \qquad \text{Eq. 7}$$
$$Pr(N_m^F|NULL) Pr(N_m^F.TC_{[1,K]}T_{[m+1,n]}^F|T_{[i,j]}^E, A)$$

where K is the degree of $N_m^F$.

If $N_i^E$ is deleted, and $N_i^E$'s children $N_i^E.C_{[1,K]}$ is combined with $T_{[i+1,j]}^E$ to aligned with $T_{[m,n]}^F$, then:

$$Pr(T_{[m,n]}^F|T_{[i,j]}^E,A)=Pr(T_{[m,n]}^F|N_m^F.TC_{[1,K]}T_{[i+1,j]}^E,A) \qquad \text{Eq. 8}$$

where K is the degree of $N_i^E$.

Finally, the node translation probability is illustratively modeled as $Pr(N_i^F|N_j^E) \approx Pr(N_i^F l|N_i^E l)Pr(N_i^F i|N_i^E i)$, and the text translation probability $Pr(t^F|t^E)$ is modeled by modeling word-for-word translation from English to French without considering word order. Of course, other models can be used as well.

Having thus described the model, the parameters for the model must be estimated. In one exemplary embodiment, the tree alignment model involves three categories of parameters, including a text translation probability $Pr(t^F|t^E)$ which is the probability of translating an English text fragment $t^E$ as a French text fragment $t^F$, the tag mapping probability $Pr(l|l')$ which is the probability of two tags being mapped to one another, and a node deletion probability $p_d$, which is described above. Any desired, and conventional, parameter estimation techniques can be used.

It will also be noted that, in order to accomplish the iterative alignment process described with respect to FIG. 4 above, a bottom up approach can be used. It will be appreciated that if two trees are optimally aligned, the alignment of their subtrees must be optimal as well. Thus, in the decoding process, dynamic programming techniques can be applied to find the optimal tree alignment using that of subtrees in a bottom up manner. Table 1 sets out pseudo-code for such a decoding algorithm.

TABLE 1

```
For i=|T^F| to 1 (bottom-up) {
    For j=|T^E| to 1 (bottom-up) {
        derive the best alignment between
        T_i^F.TC_{[1,Ki]}  and T_j^E.TC_{[1,Kj]}, and compute
        the best alignment score
        argmax_A S_A(T_i^F.TC_{[1,Ki]}|T_j^E.TC_{[1,Kj]}) }}
    where |T^F| and |T^E| are number of nodes in T^F and T^E;
    K_i and K_j are degrees of N_i^F and N_i^E.
```

It can thus be seen that conventional methods of attempting to identify parallel web content, that remove all layout information (such as HTML tags) and only rely on conventional sentence alignment, can be improved. By first applying tree alignment to align parallel text chunks, and then using more fine alignment (such as sentence alignment) to extract parallel sentences from the aligned text chunks, better performance is obtained.

Figure 5:
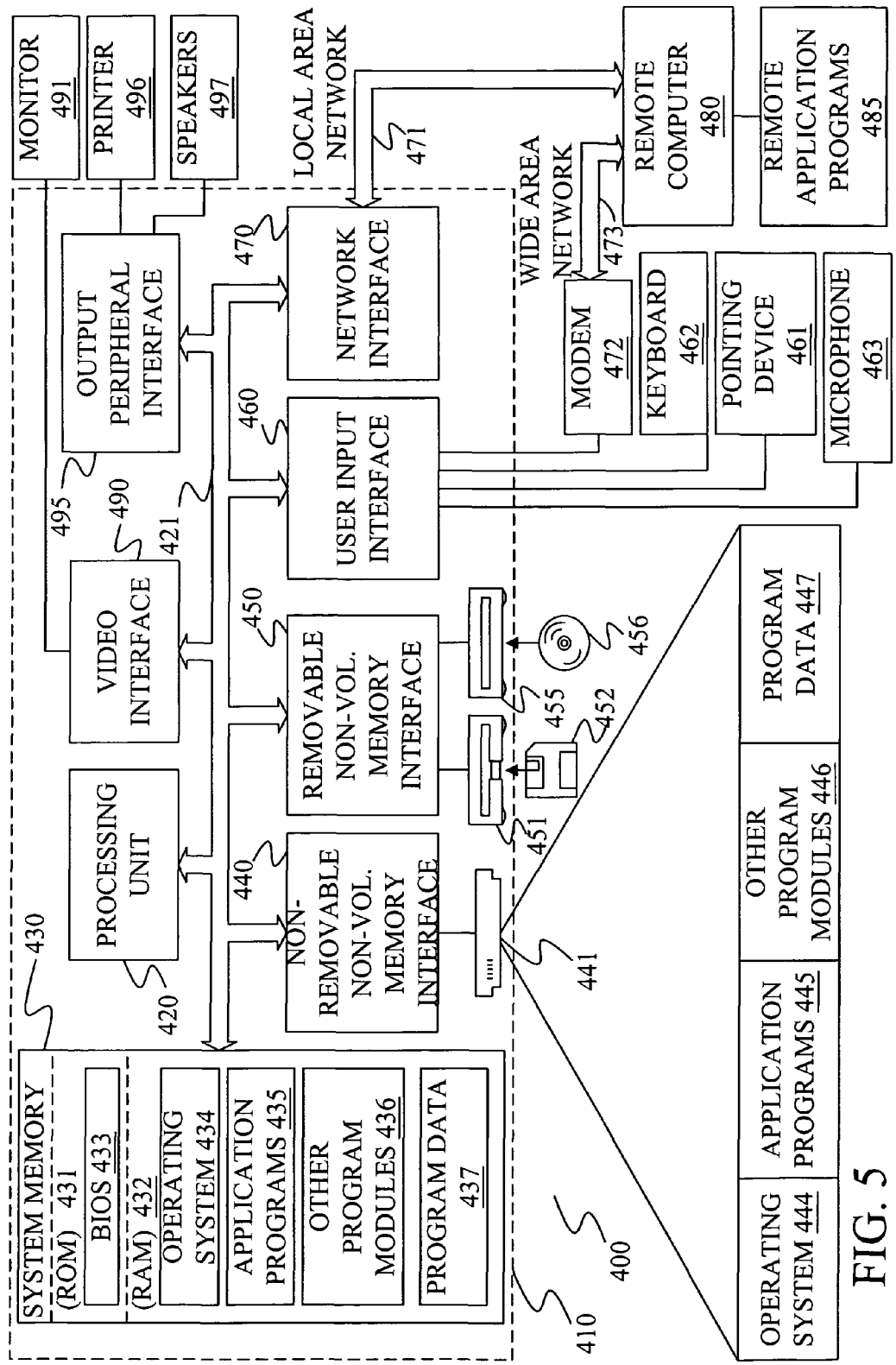
FIG. 5 is a block diagram of one illustrative operating environment.

FIG. 5 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 5 illustrates operating system 434, application programs 435, other program modules 436, and program data 437.

The computer 410 may also include other removable/non-removable volatile/nonvolatile computer storage media. By way of example only, FIG. 5 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 5, provide storage of computer readable instructions, data structures, program modules and other data for the computer 410. In FIG. 5, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 5 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 5 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of identifying parallel bilingual corpora from one or more larger corpora accessible over a network using a computer with a processor, comprising:

accessing a given website;

identifying specific trigger words in text of hyperlinks on pages of the given website that link to other pages;

selecting a first subset of data in a first language and a second subset of data in a second language from the other pages linked to by the hyperlinks that have the specific trigger words;

verifying sufficient parallelism between the first and second subsets of the data based on a plurality of features of the first and second subsets of data, the features being indicative of whether the second subset of data is a translation of the first subset of data;

if the first and second subsets of data are sufficiently parallel, obtaining, with the processor, a first tree structure corresponding to the first subset of data and a second tree structure corresponding to the second subset of data, each tree structure having hierarchically and sequentially arranged nodes comprising hyperlink tags and text nodes representing hyperlinks and text in the corresponding subset of data;

aligning, with the processor, the tree structures corresponding to each of the subsets of data according to a hierarchically and sequentially invariant alignment such that when a first node in the first tree structure is aligned with a second node in the second tree structure, then nodes that descend from the second node in the second tree structure are either deleted or aligned with nodes that descend from the first node in the first tree structure and nodes that descend from the first node in the first tree structure are either deleted or aligned with nodes that descend from the second node in the second tree structure;

identifying parallel textual segments of the subsets of data based on the alignment of the tree structures; and outputting an indication of the parallel textual segments.

2. The method of claim 1 wherein the first and second subsets of data comprise first and second pages having hyperlinks to other documents, and further comprising:

identifying parallel hyperlinks in the first and second documents based on the alignment of the tree structures, the parallel hyperlinks linking to a subsequent document in the first language and a subsequent document in the second language, respectively.

3. The method of claim 2 and further comprising:
obtaining a tree structure corresponding to each of the subsequent documents;
aligning the tree structures corresponding to the subsequent documents; and
identifying parallel textual segments in the subsequent documents.

4. The method of claim 3 and further comprising:
identifying parallel hyperlinks in the subsequent documents.

5. The method of claim 4 and further comprising:
recursively repeating the steps of:
- obtaining a tree structure corresponding to each of the subsequent documents;
- aligning the tree structures corresponding to the subsequent documents;
- identifying parallel textual segments in the subsequent documents; and
- identifying parallel hyperlinks in the subsequent documents.

6. The method of claim 1 wherein accessing a given website comprises:
downloading a root page for the given website and first level pages linked to the root page.

7. The method of claim 1 wherein obtaining a tree structure comprises:
obtaining a document object model tree corresponding to each of the subsets of data.

8. A computer implemented method of identifying parallel, bilingual data in first and second documents, the first document being in a first language and the second document being in a second language, comprising:
obtaining, with a computer processor, first and second document tree structures representative of a layout of the first and second documents, respectively, the document tree structures including nodes corresponding to text and hyperlinks in the first and second documents;
aligning, with the computer processor, the first and second document tree structures by aligning nodes in the tree structures with one another while preserving a sequence and hierarchy of the nodes in the document tree structures, such that when a first node in the first document tree structure is aligned with a second node in the second document tree structure, nodes that descend from the second node in the second document tree structure are either deleted or aligned with nodes that descend from the first node in the first document tree structure and nodes that descend from the first node in the first document tree structure are either deleted or aligned with nodes that descend from the second node in the second document tree structure; and
identifying, for use in machine translation, parallel, bilingual text segments as text segments corresponding to aligned nodes in the first and second document tree structures.

9. The method of claim 8 wherein the first and second documents each comprise a web page and wherein aligning text comprises aligning sentences within the identified parallel, bilingual text segments.

10. The method of claim 8 wherein each of the first and second document tree structures includes a plurality of subtree structures, and wherein aligning the first and second document tree structures comprises:
aligning nodes in the subtree structures to obtain subtree alignments; and
aligning the plurality of subtree structures, to align the first and second document tree structures, based on the subtree alignments.

11. The method of claim 10 and further comprising:
iteratively repeating the steps of aligning nodes in the subtree structures to obtain subtree alignments and aligning the plurality of subtrees structures based on the subtree alignments.

12. The method of claim 10 wherein aligning the plurality of subtree structures comprises:
aligning the plurality of subtree structures while maintaining a hierarchy and sequence of the plurality of subtree structures relative to one another and of nodes in the subtree structures relative to one another.

13. The method of claim 8 wherein obtaining the first and second document tree structures comprises:
obtaining first and second document object model tree structures; and
revising the first and second document object model tree structures by combining text nodes with parent nodes of the text nodes and by deleting nodes that are not in a predefined subset of nodes in the document object model.

\* \* \* \* \*

UNITED STATES PATENT AND TRADEMARK OFFICE
CERTIFICATE OF CORRECTION

PATENT NO.      : 7,805,289 B2
APPLICATION NO. : 11/483941
DATED           : September 28, 2010
INVENTOR(S)     : Ming Zhou et al.

It is certified that error appears in the above-identified patent and that said Letters Patent is hereby corrected as shown below:

In column 13, line 44, in Claim 8, after "structure," insert -- the --.

Signed and Sealed this
Fifteenth Day of February, 2011

David J. Kappos
*Director of the United States Patent and Trademark Office*